L. S. CLARKSON.
DRILLING MACHINE.
APPLICATION FILED JUNE 3, 1914.

1,179,612.

Patented Apr. 18, 1916.

Witnesses

Inventor
L. S. Clarkson
By
Attorneys

UNITED STATES PATENT OFFICE.

LOUIS S. CLARKSON, OF SEATTLE, WASHINGTON.

DRILLING-MACHINE.

1,179,612.   Specification of Letters Patent.   Patented Apr. 18, 1916.

Application filed June 3, 1914. Serial No. 842,670.

*To all whom it may concern:*

Be it known that I, LOUIS S. CLARKSON, a citizen of the United States, residing at Seattle, in the county of King and State of Washington, have invented certain new and useful Improvements in Drilling-Machines; and I do hereby declare the following to be a full, clear, and exact description of the invention, such as will enable others skilled in the art to which it appertains to make and use the same.

This invention relates to a drilling machine and more particularly to the class of drilling machine wherein the drill is raised and suddenly dropped.

An object of the invention is to provide for the raising of the drill and the automatic dropping of the same.

A further object of the invention is to provide for the continuous intermittent raising and dropping.

With these and other objects in view, this invention comprises the combination and arrangement of parts as herein set forth and subsequently claimed.

Figure 1:
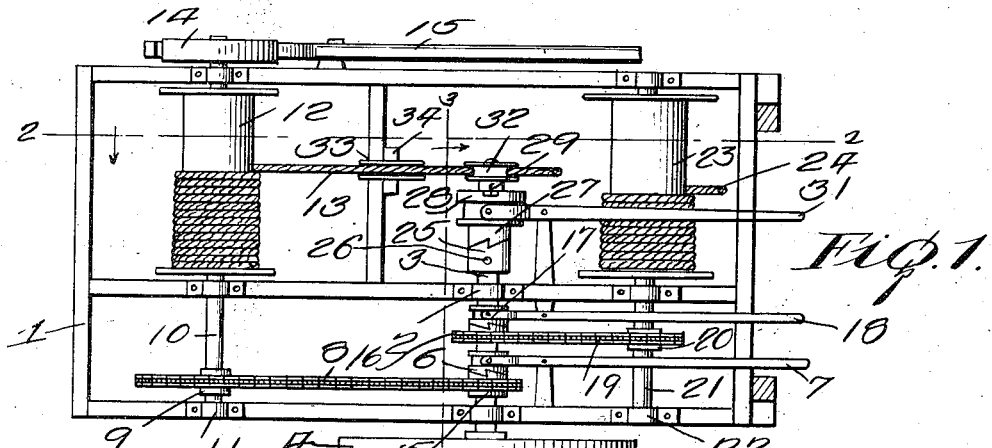
Figure 2:
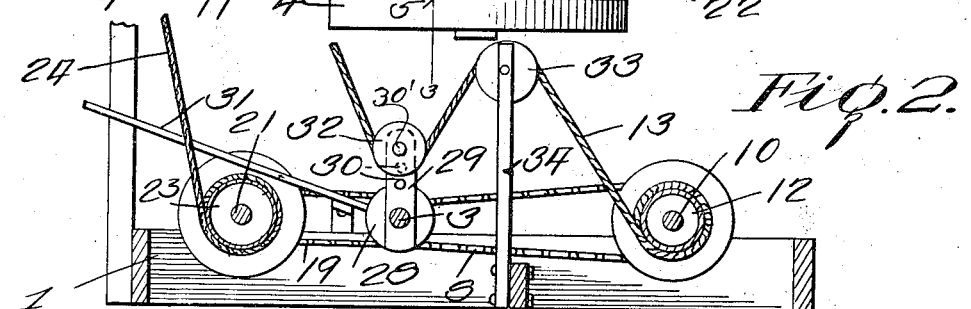
Figure 3:
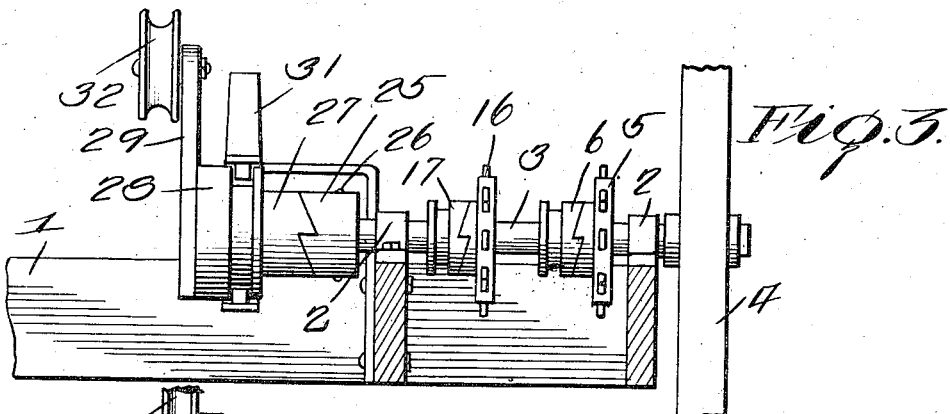
Figure 4:
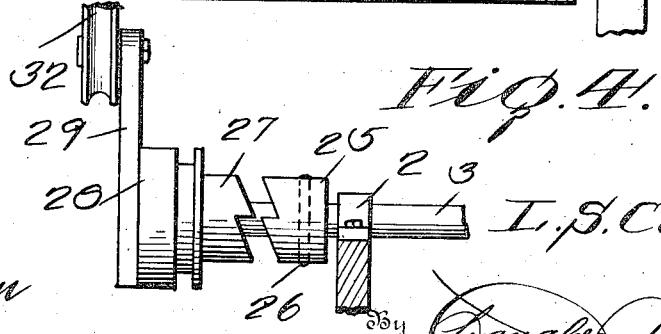

Referring to the drawing: Figure 1 is a plan view of my device. Fig. 2 is a section on the line 2—2 of Fig. 1. Fig. 3 is a section on line 3—3 of Fig. 1. Fig. 4 is an enlarged detail showing the clutch in inoperative position.

Referring to the drawing by reference characters wherein like parts are indicated by like characters throughout the several views: The front of the machine has rotatably mounted in bearings 2 a drive shaft 3 on one end of which is a belt pulley 4 by means of which the shaft is rotated. Loosely mounted on the shaft is a gear wheel 5 adapted to coöperate with a clutch 6 on said shaft to cause the same to rotate therewith. Said gear wheel is controlled by an operating lever 7 to throw the same into or out of engagement with its clutch. Rotatably mounted on the gear wheel is a chain 8 which coöperates with a second gear wheel fixedly mounted on a shaft 10 rotatable in bearings 11 on the frame of the machine, the rotation of which gear wheel 9 causes the drill rope drum 12 to be rotated to wind the drill rope 13. On the end of the shaft 10 is a brake wheel 14 which is adapted to coöperate with a brake lever 15 fixed to the side of the frame. After the drill rope has been wound the desired distance before the machine is operated, the gear wheel 5 is thrown out of engagement with its clutch 6 and allows the shaft 3 to rotate idly therethrough and the brake wheel 14 and the lever 15 prevent the accidental rotation of the drum 12. Loosely mounted on the shaft 3 is another gear wheel 16 which coöperates with a clutch 17 fixed to said shaft and is controlled by a lever 18. Mounted on this gear wheel 16 is a chain 19 which coöperates with a gear wheel 20 fixed to a shaft 21 mounted in bearings 22 on the frame of the machine. By the rotation of this shaft 21 the sand line drum 23 which is fixed to the said shaft is rotated, thus winding the sand line 24.

To the end of the shaft 3 is secured a clutch member 25 by a set screw 26. Loosely mounted on the end of the shaft is a second clutch member 27 having an enlargement 28 on its end and an outwardly projecting arm 29 having a series of apertures 30 therein. Mounted on this enlarged portion 28 is a controlling lever 31 by means of which the clutch member 27 may be thrown into or out of engagement with the clutch member 25.

Adjustably secured on the arm 29 is a pulley 32. The drill rope is secured to the drum 12, passes over a pulley 33 secured to a bracket 34 and then is looped back to the plane of the frame and passes under the pulley 32 and thence upwardly and over the frame from which the drill is dropped.

In operation after the drill rope and the sand line have been unreeled to their proper positions, the brake means on the shaft 10 is applied and thus holds the drill rope drum 12 in a stationary position, it being of course understood that the driving gear 5 has been previously disengaged from its clutch 6. The drive gear 16 for the sand line drum is then by means of the lever 18 disengaged from its clutch 17, the rotation of the shaft 3 is then started by means of the engagement of a driving belt with the pulley 4 and with it the clutch member 25 is rotated, the lever 31 is then operated to throw into engagement with the aforementioned clutch member the clutch member 27 which is slidable on the shaft 3. This causes the clutch member 27 to rotate and to move the arm 29 downwardly since this arm is secured rigidly to the enlargement 28 on this clutch member 27. The downward movement of this arm 29 causes the end of the drill rope 13 to be drawn upwardly from the hole which is being drilled and with it the drill. Since the opposite end of the rope is stationary, it being attached to the drum 12. As soon as the arm 29 completes one-half of its revolution the weight of the drill causes the said arm to rotate faster than the clutch member 25, this rotates the clutch member 27 ahead of the clutch member 25 and causes the drill to be rapidly dropped. When the drill gear strikes bottom the arm 29 assumes its initial position, the clutch member 27 comes to a stop and by the continued rotation of the shaft 3 the clutch member 25 catches up with the clutch member 27 and again engages the same, which causes it to be rotated one-half of its revolution whereby the first described operation is repeated, and as long as the shaft 3 is rotated this operation continues, that is the alternate raising of the drill and the sudden dropping thereof.

In order that the distance the drill is raised may be varied I have provided in the arm 29 registering perforations 30 aforementioned so that the pulley 32 may be adjusted upon the arm 29 by changing its pivotal point thereon by means of the removable pivot 30'. It is of course understood that the greater distance this pulley is from the point of attachment of the arm 29 to the clutch member the farther the drill will be drawn up.

From the foregoing description it may be seen that I have provided a device which will automatically raise the drill and rapidly drop the same and will then again automatically grip the raising means and complete the cycle of operations again.

I do not wish to be limited to the particular construction of my invention shown, but only so far as is necessary by the claim.

What is claimed is:—

In a drilling machine, the combination with a frame, of a pair of spaced drums mounted thereon, a drill rope wound upon one of the drums, a sand line wound upon the other drum, a drive shaft, a pulley beneath which said drill rope extends, a sprocket loosely mounted upon the drive shaft, a similar sprocket connected to one of the drums, a chain passing over the sprockets, a second sprocket loosely mounted upon the shaft, a sprocket connected to the other drum, a chain passing over the last mentioned sprocket, a clutch for securing each of the sprockets on the drive shaft to the same, and a clutch having its teeth extending in opposite directions to those of the first mentioned sprockets, for securing the pulley to the shaft.

In testimony whereof, I affix my signature, in the presence of two witnesses.

LOUIS S. CLARKSON.

Witnesses:
 A. G. GODAHL,
 CARL A. WOLF.